US008630416B2

(12) United States Patent
Qi et al.

(10) Patent No.: US 8,630,416 B2
(45) Date of Patent: Jan. 14, 2014

(54) WIRELESS DEVICE AND METHOD FOR REKEYING WITH REDUCED PACKET LOSS FOR HIGH-THROUGHPUT WIRELESS COMMUNICATIONS

(75) Inventors: Emily H. Qi, Portland, OR (US); Jesse R. Walker, Portland, OR (US); Robert J. Stacey, Portland, OR (US); Herbert Liondas, Zichron Yaakov (IL); Marc Jalfon, Zichron Yaakov (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 12/643,009

(22) Filed: Dec. 21, 2009

(65) Prior Publication Data

US 2011/0150223 A1 Jun. 23, 2011

(51) Int. Cl.
*H04L 29/06* (2006.01)
(52) U.S. Cl.
USPC ........... 380/273; 380/270; 380/278; 380/279; 380/280; 380/281; 380/282; 380/283; 380/284; 380/285; 380/44; 380/45; 380/46; 380/47
(58) Field of Classification Search
USPC ............. 380/273, 277–286, 44–47, 247–250, 380/270
See application file for complete search history.

(56) References Cited

U.S. PATENT DOCUMENTS

| 7,065,643 | B1 * | 6/2006 | Cornils et al. ................ 713/163 |
| 7,245,724 | B1 * | 7/2007 | Chesson et al. ............... 380/270 |
| 7,266,201 | B1 * | 9/2007 | Lin ............................... 380/278 |
| 7,526,092 | B2 * | 4/2009 | Chesson et al. ............... 380/273 |
| 7,844,057 | B2 * | 11/2010 | Meier et al. .................... 380/270 |
| 7,969,945 | B2 * | 6/2011 | Navali et al. .................. 370/331 |
| 2003/0120611 | A1 * | 6/2003 | Yoshino et al. .................. 705/67 |
| 2005/0138352 | A1 * | 6/2005 | Gauvreau et al. ............. 713/153 |
| 2006/0115089 | A1 * | 6/2006 | Carter et al. ................... 380/273 |

(Continued)

FOREIGN PATENT DOCUMENTS

| CN | 1512700 A | 7/2004 |
| EP | 2517400 A2 | 10/2012 |
| WO | WO-2008096396 A1 | 8/2008 |
| WO | WO-2011084263 A2 | 7/2011 |

OTHER PUBLICATIONS 802.11-2007, Wireless LAN Medium Access Control (MAC) and Physical Layer (PHY) Specification, 2007.*

(Continued)

*Primary Examiner* — Andy Rao
*Assistant Examiner* — Shan Elahi
(74) *Attorney, Agent, or Firm* — Schwegman, Lundberg & Woessner, P.A.

(57) ABSTRACT

Embodiments of a wireless device and methods for rekeying with reduced packet loss in a wireless network are generally described herein. In some embodiments, during rekeying operations a new key for reception may be installed early (i.e., prior to receipt of a rekeying confirmation message). The use of the new key for transmission may be delayed until after receipt of the rekeying confirmation message. The early installation of the new key for reception may allow both the new key and old key to be active at the same time for use decrypting received packets to reduce packet loss during rekeying operations. The rekeying confirmation message may be the fourth message of a four-way handshake for rekeying. In some embodiments, two key identifiers may be alternated between four-way handshakes to prevent deletion of the old key.

24 Claims, 4 Drawing Sheets

(56) References Cited

U.S. PATENT DOCUMENTS

| | | | | |
|---|---|---|---|---|
| 2006/0133614 | A1* | 6/2006 | Zhang et al. | 380/273 |
| 2006/0168451 | A1* | 7/2006 | Ishibashi et al. | 713/176 |
| 2006/0291662 | A1* | 12/2006 | Takahashi et al. | 380/278 |
| 2007/0008922 | A1* | 1/2007 | Abhishek et al. | 370/329 |
| 2007/0106892 | A1* | 5/2007 | Engberg | 713/168 |
| 2007/0201700 | A1 | 8/2007 | Hacigumus | |
| 2007/0253554 | A1 | 11/2007 | Chesson et al. | |
| 2007/0288997 | A1 | 12/2007 | Meier et al. | |
| 2008/0080713 | A1* | 4/2008 | Cho et al. | 380/273 |
| 2008/0267407 | A1* | 10/2008 | Vanderveen | 380/277 |
| 2009/0259588 | A1* | 10/2009 | Lindsay | 705/40 |

OTHER PUBLICATIONS

IEEE 802.11-2007, IEEE Standard for Information Technology, 2007.*

"Part 11: Wireless LAN MAC and PHY Specifications", *IEEE Std 802.11-2007*, (2007), 211-220.

"international Application Serial No. PCT/US2010-058221, International Preliminary Report on Patentability mailed Jul. 5, 2012", 6 pgs.

"International Application Serial No. PCT/US2010/058221, International Search Report mailed Jul. 28, 2011", 3 pgs.

"International Application Serial No. PCT/US2010/058221, Written Opinion mailed Jul. 28, 2011", 4 pgs.

"Chinese Application Serial No. 201010615492.7, Office Action mailed Apr. 15, 2013", 19 pgs.

"Chinese Application Serial No. 201010615492.7, Response filed Aug. 29, 2013 to Office Action mailed Apr. 15, 2013", 22 pgs.

"IEEE Standard for Information Technology Telecommunications and information exchange between systems Local and metropolitan area networks Specific requirements", Part 11: Wireless LAN Medium Access Control (MAC) and Physical Layer (PHY) Specifications IEEE Std 802.11.-2007, IEEE, (2007), 211-221.

"Japanese Application Serial No. 2012-544563, Office Action mailed Aug. 13, 2013", 3 pgs.

"Part 11: Wireless LAN Medium Access Control (MAC) and Physical Layer (PHY) specifications: Amendment 6: Medium Access Control (MAC) Security Enhancements", IIEEE Computer Society, Std 802.11i-2004, Local and Metropolitan Area Networks, (2004), 16.

"European Application Serial No. 10842434.2, Preliminary Amendment mailed Jan. 25, 2013", 12 pgs.

\* cited by examiner

WIRELESS DEVICE

WIRELESS DEVICE AND METHOD FOR REKEYING WITH REDUCED PACKET LOSS FOR HIGH-THROUGHPUT WIRELESS COMMUNICATIONS

TECHNICAL FIELD

Embodiments pertain to wireless communications. Some embodiments pertain to rekeying operations in wireless networks. Some embodiments pertain to a four-way handshake for rekeying operations in accordance with one of the IEEE 802.11 standards. Some embodiments pertain to video streaming in high-throughput wireless networks.

BACKGROUND

In many wireless networks, packets are encrypted with encryption keys to provide security. Upon the occurrence of certain conditions, the encryption keys are renewed and new keys are generated. During the rekeying process, there may be a short period of time when the stations are using different keys. As a result, some of the packets are not able to be decrypted and have to be discarded. This loss of packets is particularly an issue in very high-throughput situations such as video streaming because it may result in a disruption in the video. This packet loss may also affect the slow start algorithm for the transmission control protocol (TCP).

Thus there are general needs for wireless devices and methods for rekeying with reduced packet loss suitable for very high-throughput wireless communications.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
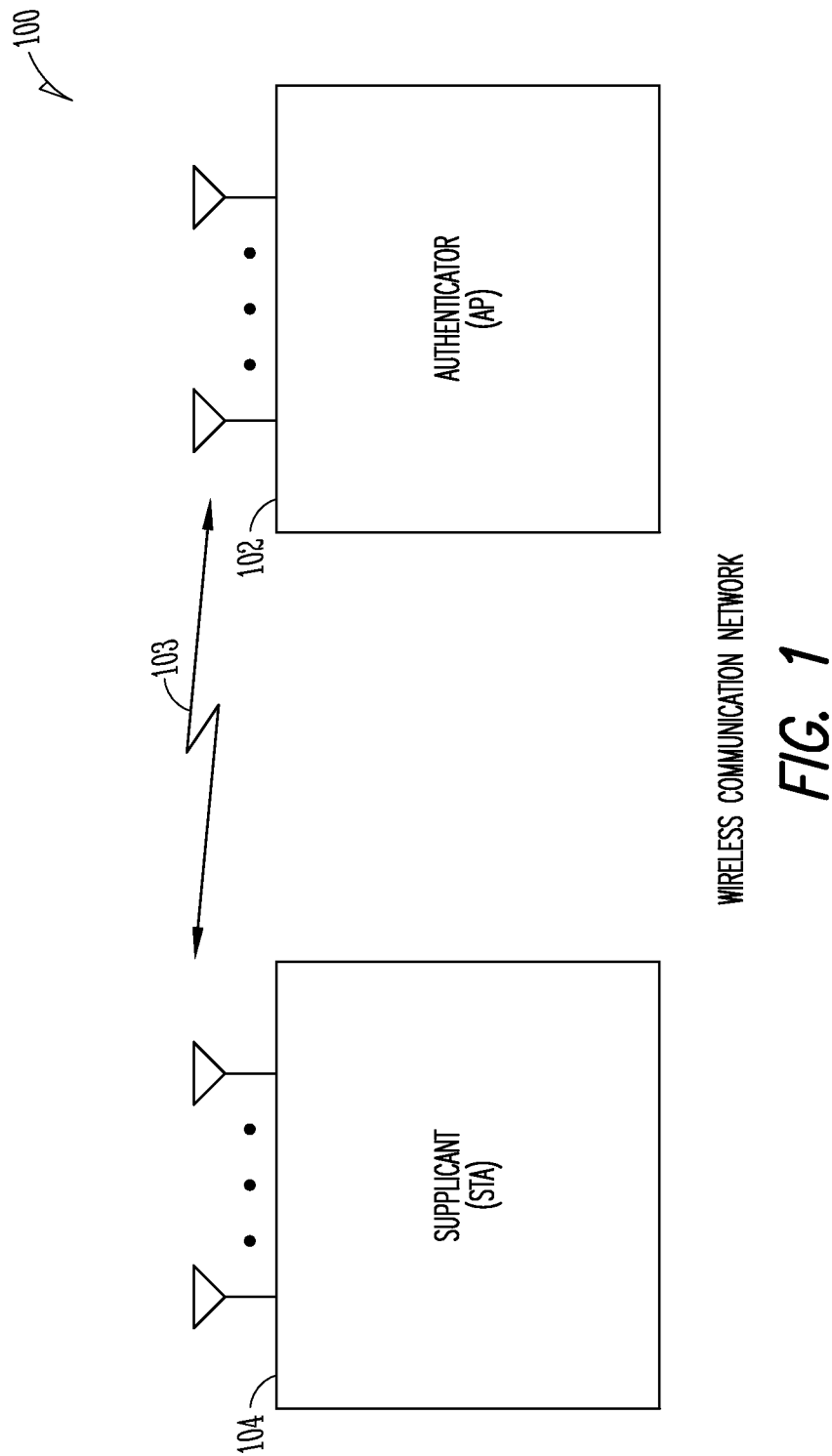
FIG. 1 is a wireless communication network in accordance with some embodiments.

FIG. 1 is a wireless communication network in accordance with some embodiments. Wireless communication network 100 may include two or more wireless devices, such as an authenticator 102 and a supplicant 104. The authenticator 102 and the supplicant 104 may communicate through a wireless channel in accordance with one or more wireless communication techniques, such as one of the IEEE 802.11 communication standards. In some embodiments, the authenticator 102 may be an access point (AP) and the supplicant 104 may be a mobile station (STA).

The authenticator 102 and the supplicant 104 may communicate packets that are encrypted using encryption keys. The encryption keys may be generated during a successful authentication process between the authenticator 102 and the supplicant 104. The encryption keys may be updated through a subsequent rekeying process between the authenticator 102 and the supplicant 104. The rekeying process may include a four-way handshake described in more detail below.

In accordance with embodiments, to help reduce packet loss during rekeying operations, the authenticator 102 may install a new key for reception prior to receipt of a re-keying confirmation message. The authenticator 102 may also delay the use of the new key for transmission until after receipt of the re-keying confirmation message. In accordance with embodiments, the supplicant 104 may install the new key for reception prior to transmission of the rekeying confirmation message and may delay using the new key for transmission until after the transmission of the re-keying confirmation message. The early installation of the new key for reception by both the authenticator 102 and the supplicant 104 allows both the new key and old key to be active at the same time for use in decrypting received packets. In this way, packet loss during rekeying operations may be reduced. These embodiments are discussed in more detail below.

In some embodiments, the rekeying process may be part of a four-way handshake 103, and the rekeying confirmation message may be the fourth message of the four-way handshake. In some embodiments, the new key may be an asymmetric key generated by both the supplicant 104 and the authenticator 102 from information exchanged during the four-way handshake. These embodiments are discussed in more detail below.

Conventionally, a new key is not installed and used by the authenticator 102 for reception until after receipt of the rekeying confirmation message. Conventionally, the new key is not installed and used by the supplicant 104 for reception until after transmission of the rekeying confirmation message. Because these events are not synchronized, some packets received before completion of the rekeying process may not be able to be properly decrypted. In accordance with some embodiments, the early installation and use of the new key for reception and the continued support of the old key for reception allows packets that were encrypted with either the old key or the new key to be properly decrypted. Unlike conventional rekeying techniques, two or more keys for reception may be active at the same time and may be used for decrypting received packets.

The Institute for Electrical and Electronic Engineer's (IEEE) 802.11i draft standard defines a protocol (802.11i protocol) for establishing mutual authentication and unicast group keys between a mobile station and its associated access point. The 802.11i protocol uses the four-way handshake to verify session liveliness to establish a unicast key and to establish a group key. Some embodiments may be layered on top of the IEEE 802.11 four-way handshake to reduce packet loss that may occur during rekeying.

In some embodiments, the authenticator 102 is an access point and the supplicant 104 is a mobile station. In these embodiments, the access point and the mobile station may communicate in accordance with one of the IEEE 802.11 communication standards or draft standards. In some embodiments, the rekeying operations may be performed during a communication session that includes a video-streaming session in which unicast packets are streamed from the access point to the mobile station. Although the authenticator 102 is described in some embodiments as an access point and the supplicant 104 is described in some embodiments as a mobile station, the scope of the embodiments is not limited in this respect. In some alternate embodiments, the authenticator may be a mobile station and the supplicant may be an access point. In other alternate embodiments, the authenticator and supplicant may both be mobile stations.

In some embodiments, key generation may be triggered by the pending lifetime expiry of an existing key. A key may expire after a predetermined period of time (e.g., 12 hours). Key generation may also be triggered by the pending exhaustion of the packet number. Each packet is assigned a packet number to detect replay attacks. The packet number is unique for each packet encrypted using a given key. If the packet number space is exhausted (i.e., all the packet numbers are assigned) then a new key is generated. Rekeying may be performed before any of these events occurs to prevent the security association from being broken.

Figure 2:
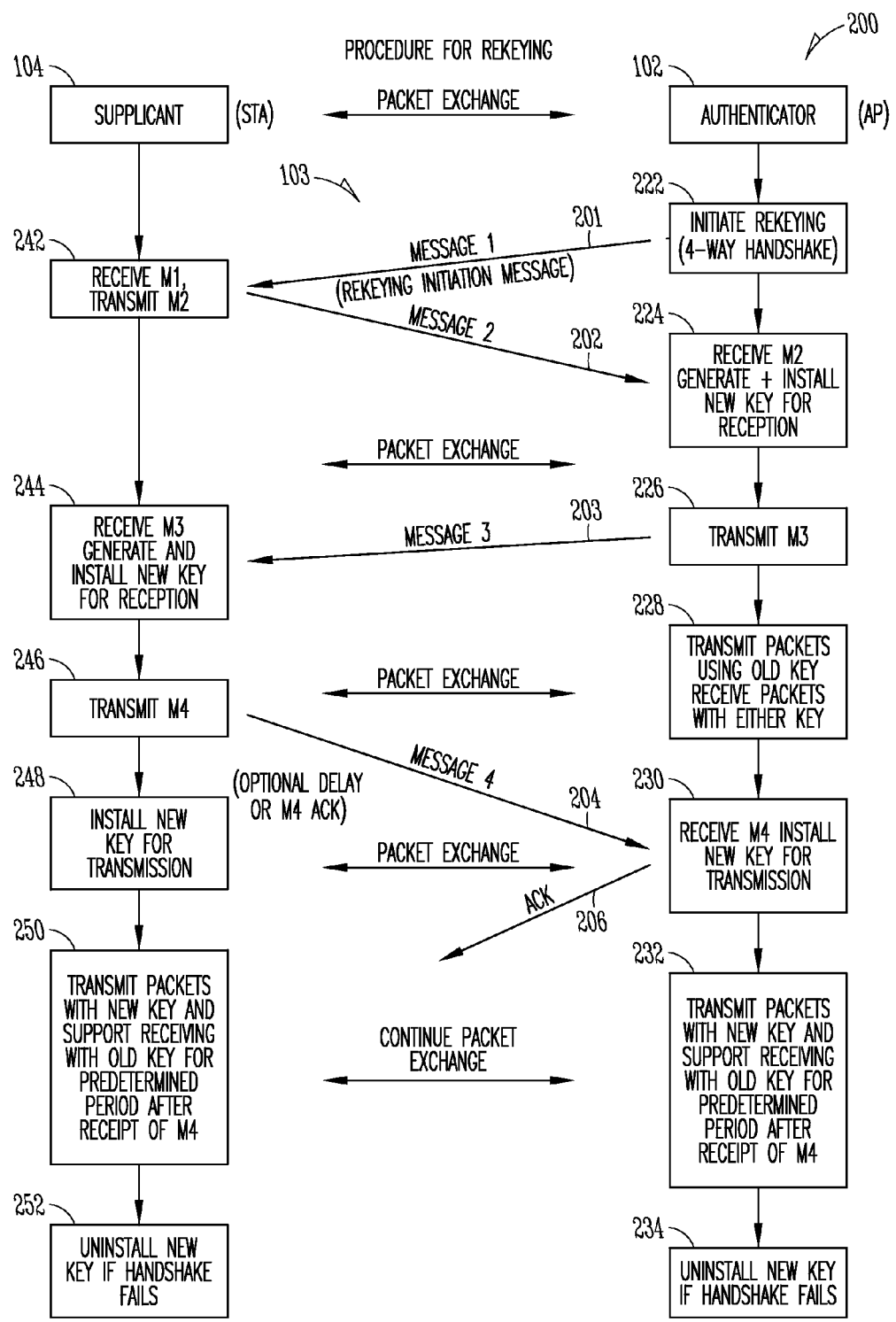
FIG. 2 illustrates a procedure for rekeying with reduced packet loss in accordance with some embodiments.

FIG. 2 illustrates a procedure for rekeying with reduced packet loss in accordance with some embodiments. In procedure 200, the supplicant 104 and the authenticator 102 may have an established security association and may exchange packets using one or more encryption keys. Upon the occurrence of a rekeying event, the authenticator 102 may transmit a rekeying initiation message 201 to initiate the rekeying process in operation 222. In response to receipt of the rekeying initiation message 201, the supplicant 104 may transmit a rekeying initiation response message 202 to the authenticator 102 in operation 242. The authenticator 102 may receive the rekeying initiation response message 202 in operation 224. In response to receipt of the rekeying initiation response message 202, the authenticator 102 may generate and install a new key for reception. The information transmitted in the rekeying initiation message 201 and received in the rekeying initiation response message 202 may be used to generate the new key.

In operation 226, the authenticator 102 transmits a response validation message 203 in response to the rekeying initiation response message 202. In operation 244, the supplicant 104 receives the response validation message 203 and may generate and install the new key for reception prior to transmission of the rekeying confirmation message 204. The response validation message 203 may demonstrate to the supplicant 104 that the exchange is not subject to a man-in-the-middle attack. Both the supplicant 104 and the authenticator 102 are able to generate the same new key because of the information exchanged.

In these embodiments, the authenticator 102 may install a new key for reception prior to transmission of the response validation message 203, and the supplicant 104 may install the new key for reception prior to transmission of the rekeying confirmation message 204. In this way, both the new key and the old key may be used for reception. These embodiments may be described in more detail below.

In some embodiments, after installing the new key for reception in operation 224, the authenticator 102 may use either the new key or an old key for reception while continuing to use the old key for transmission in operation 228. In operation 244, the supplicant 104 may install the new key for reception prior to transmission of the rekeying confirmation message 204 and may delay using the new key for transmission until after the transmission of the rekeying confirmation message 204.

During operation 228, the authenticator 102 may use either the new key or an old key to decrypt packets received from the supplicant 104 beginning prior to receipt of the rekeying confirmation message 204 until a predetermined period of time after receipt of the rekeying confirmation message 204. The authenticator 102 may also delay using the new key to encrypt packets for transmission to the supplicant 104 until after receipt of the rekeying confirmation message 204. In some embodiments, the authenticator 102 may delay use of the new key for encrypting packets for transmission until immediately after receipt of the rekeying confirmation message 204 or until a predetermined period of time after receipt of the rekeying confirmation message 204.

In some embodiments, the supplicant 104 may delay installing and/or using the new key for transmission in operation 248 until immediately after sending the rekeying confirmation message 204 in operation 246 or a predetermined period of time after sending the rekeying confirmation message 204 in operation 246. In some alternate embodiments, the supplicant 104 may delay using the new key for transmission until a predetermined period of time after receipt of the response validation message 203.

In some embodiments, after installing the new key in operation 224 for reception prior to receipt of the rekeying confirmation message 204, the authenticator 102 may select either the new key or an old key for decrypting received unicast packets based on a key identifier carried in the received unicast packets. In these embodiments, the authenticator 102 may support receiving with the old key until receipt of the rekeying confirmation message 204 or until a predetermined period of time after receipt of the rekeying confirmation message 204. In these embodiments, the supplicant 104 may support receiving with the old key until transmission of the rekeying confirmation message 204 in operation 246 or until a predetermined period of time after transmission of the rekeying confirmation message 204 in operation 246. In some embodiments, the predetermined period of time may be approximately sixty seconds, although this is not a requirement.

In operation 232, the authenticator 102 may transmit packets encrypted with the new key and may support receptions of packets with the old key and the new key. Similarly, in operation 250, the supplicant 104 may transmit packets encrypted with the new key and may support receptions of packets with the old key and the new key.

In some embodiments, the rekeying initiation message 201 may be Message 1 (M1) of a four-way handshake 103, the rekeying initiation response message 202 may be Message 2 (M2) of the four-way handshake 103, the response validation message 203 may be Message 3 (M3) of the four-way handshake 103 and the rekeying confirmation message 204 may be Message 4 (M4) of the four-way handshake 103. In these embodiments, the authenticator 102 may install the new key for use in decrypting received packets after receipt of Message 2 and prior to transmission of Message 3. The authenticator 102 may also delay use of the new key for encrypting packets for transmission until after receipt of Message 4. The supplicant 104 may install the new key for use in decrypting received messages after receipt of Message 3 and prior to transmission of Message 4. The supplicant 104 may delay installing the new key for use in encrypting packets for transmission until either immediately after transmission of Message 4 or a predetermined period of time after transmission of Message 4. Unlike the case for receiving that supports the concurrent use of two keys for reception, when the new key is installed for transmitting, the old key is no longer used for transmitting.

In operation 234, the authenticator 102 may uninstall the new key if the four-way handshake 103 fails to complete. In operation 252, the supplicant 104 may uninstall the new key if the four-way handshake 103 fails to complete. In these embodiments, both the authenticator 102 and the supplicant 104 may refrain from any further use of the new key for both reception and transmission if the four-way handshake 103 fails to complete. The authenticator 102 assumes success of the four-way handshake 103 on receipt of the rekeying confirmation message 204 and may send an acknowledgement (ACK) 206 to the supplicant 104. The supplicant 104 may assume success of the four-way handshake 103 based on receipt of the acknowledgement 206 from the authenticator 102.

In some embodiments, the four-way handshake 103 may comprise exchanging Extensible Authentication Protocol over Local area network (EAPOL) key frames in accordance with an IEEE 802.11 communication standard. In these embodiments, the four-way handshake 103 may be part of an Extensible Authentication Protocol (EAP) and the EAPOL key frames may be EAPOL key frames in accordance with the IEEE 802.11 communication standard. In some of these embodiments, the four-way handshake 103 may be performed in accordance with the IEEE 802.11n, IEEE 802.11 ac and/or IEEE 802.11 ad communication standards or proposed standards. In these embodiments, message one, message two, message three and message four may be EAPOL key frames with the key-type subfield set to one.

In some conventional rekeying processes, the installation of a new key with the same key ID as a previous key causes the previous key to be deleted as it is replaced by the new key. In some embodiments, two key IDs may be used, and each handshake may alternate between the two key IDs. For example, a first handshake may be done with a first key ID (e.g., Key ID=0) and the next handshake may be done with a second key ID (e.g., Key ID=1). In this way, two keys may be installed, allowing a smoother handover from one key to the other (e.g., the keys for receiving are installed and then later the key is used for transmitting). The next handshake (e.g., the third handshake) may be done with the first key ID (e.g., Key ID=0) replacing the old key using Key ID=0.

Figure 3:
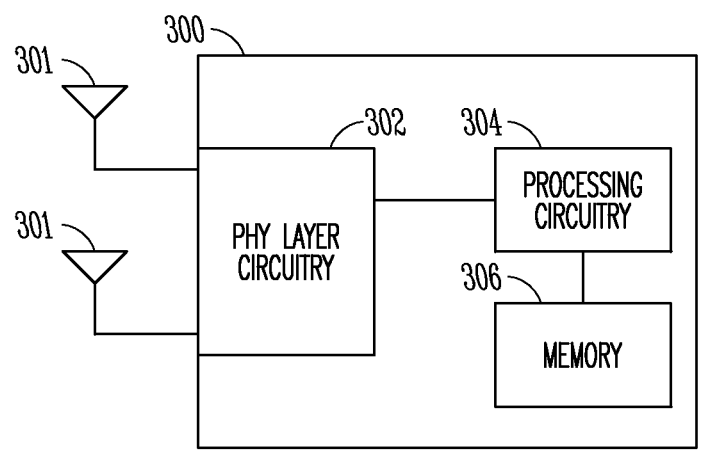
FIG. 3 is a block diagram of a wireless device in accordance with some embodiments.

FIG. 3 is a block diagram of a wireless device in accordance with some embodiments. Wireless device 300 may be suitable for use as either supplicant 104 (FIG. 1) or the authenticator 102 (FIG. 1). Wireless device 300 may include physical-layer circuitry 302, processing circuitry 304, and memory 306. In accordance with embodiments, the processing circuitry 304 may perform rekeying operations and the memory 306 may have unicast key ID space to store at least two unicast keys for use in encrypting and decrypting packets that comprise unicast traffic. When the wireless device 300 operates as an authenticator 102, the processing circuitry 304 may install a new key for reception prior to receipt of a rekeying confirmation message 204 and may delay use of the new key for transmission until after receipt of the rekeying confirmation message 204. When the wireless device 300 operates as an authenticator 102, the authenticator 102 continues to support the use of the old key for reception and the new key for reception for a predetermined period of time after receipt of the rekeying confirmation message 204.

In these embodiments, when the wireless device 300 operates as a supplicant 104, the processing circuitry 304 may install a new key for reception prior to transmission of the rekeying confirmation message 204, and may delay use of the new key for transmission until after the transmission of the rekeying confirmation message 204. When the wireless device 300 operates as the supplicant 104, the supplicant 104 continues to support the use of the old key for reception and the new key for reception until a predetermined period of time after transmission of the rekeying confirmation message 204.

In some embodiments, when supporting the use of both the new key and the old key for reception, the wireless device 300 may read a key ID field in a received unicast packet and may identify either the old key or the new key from the key ID field. The identified key may be used to decrypt the received unicast packet.

In some embodiments, the memory 306 may include non-unicast key ID space for one or more non-unicast (e.g., broadcast or multicast) keys. In these embodiments, the wireless device 300 may determine whether a received packet is either a unicast packet or a non-unicast packet based on a media-access control (MAC) address of the received packet. A non-unicast packet is a packet that is addressed to more than one recipient. A unicast packet is a packet that is addressed to one recipient. The wireless device 300 may index the unicast key ID space based on the key ID field to identify one of the unicast (e.g., pair-wise) keys when the received packet is a unicast packet. The wireless device 300 may index the non-unicast key ID space based on the key ID field to identify one of the non-unicast (i.e. group) keys when the received packet is a non-unicast packet. In these embodiments, the MAC address of the received packet may indicate whether the packet is a unicast or a non-unicast packet. When the packet is a unicast packet, a key from the unicast key space may be used for decrypting the received packet. When the packet is a non-unicast packet, a key from the non-unicast key space may be used for decrypting the received packet. The particular key may be selected from the key space based on the key ID. In some of these embodiments, the key ID for unicast packets may, for example, be either zero or one and may be used to index a key (e.g., either the old or the new key) in the unicast key space. The key ID for non-unicast packets may, for example, be zero, one, two or three, and may be used to index one of several keys in the non-unicast key space. The use of the MAC address may be used to determine which key space to index. Non-unicast packets, for example, may be broadcast or multicast packets. In these embodiments, when communications are performed in accordance with one of the IEEE 802.11 standards, the current definitions of key ID values of 0, 1, 2 and 3 in IEEE 802.11 may be changed.

In some alternate embodiments, a new-key bit of a received unicast packet may be read to determine whether to switch between keys for decrypting the received unicast packet. In these alternate embodiments, both the authenticator 102 and the supplicant 104 may set the new-key bit when transmitting a unicast packet that is encrypted with the new key. In these alternate embodiments, rather than changing how the Key ID values are defined, current or conventional key-ID definitions may be used. In these embodiments, the new-key bit may serve as a toggle indicating to the receiver to switch between keys. In these embodiments, communications may be performed in accordance with one of the IEEE 802.11 standards and a reserved bit may be used for the new-key bit. The current definitions of key ID values of 0, 1, 2 and 3 in 802.11 may also be used. In these embodiments, a key ID value of zero may be used for all unicast packets since the new-key bit used to switch between keys and key ID values of 1, 2, and 3 may be used for non-unicast packets.

In some embodiments, if the authenticator 102 has set the extended key ID field to one in Message 1, and if the supplicant 104 supports the use of an extended key ID, the supplicant 104 may negotiate to use an extended Key ID space. In these embodiments, the supplicant 104 may select the key ID to use to receive packets, with the key being negotiated, and may specify the value in the key ID field in Message 2. In these embodiments, the supplicant 104 would not include the key ID Key Data Encapsulation (KDE) in Message 2 if the authenticator 102 sets the extended key ID field to zero in Message 1.

If the authenticator 102 does not support use of the extended key ID, it may ignore the key ID KDE. If the supplicant 104 does not support the extended key ID, which may be signaled by the RSN IE extended key ID field in Message 2 being set to zero or the KDE not being present, the authenticator 102 may continue to use zero as the exclusive unicast key ID. Otherwise, the authenticator 102 may use the key ID for unicast transmissions to the supplicant 104 using a temporary key (TK) being negotiated by the four-way handshake 103. The authenticator 102 may also allocate a key ID to use to receive unicast transmissions protected by the TK being negotiated and may include this in a Key ID KDE in Message 3. The authenticator 102 may also echo the supplicant 104's value in Message 3.

If, in Message 3, the authenticator 102 signals that it agrees to support to an extended key ID by the presence of the Key ID KDE, the supplicant 104 may check that the proposed key ID of authenticator 102 is the value the supplicant 104 proposed in Message 2. If not, the four-way handshake 103 may fail. If, in Message 3, the authenticator 102 signals that it does not support an extended key ID by the presence of the Key ID KDE, the supplicant 104 may use the proposed key ID in unicast packets that the supplicant 104 protects, with the TK being negotiated. The supplicant 104 may reflect the KDE back to the authenticator 102 in Message 4. In these embodiments, the authenticator 102 may check that Message 4 included the KDE that it sent in Message 3; otherwise the four-way handshake 103 may fail.

In these embodiments, in response to receipt of a valid Message 2, the authenticator 102 may install the new key for reception with the selected key ID and may then send Message 3 indicating the new key ID in the key ID KDE. On receipt of a valid Message 3, the supplicant 104 may install the new key for receiving using the key ID received in Message 3 and may send Message 4. The authenticator 102 may then start queuing packets (e.g., MPDUs) using the new key.

The supplicant 104 may continue to support receipt of the packets using the old key for a predetermined period of time after transmitting Message 4. On receipt of Message 4, the authenticator 102 may start queuing packets using the new key and may continue to support receipt of packets using the old key for a predetermined period of time. In some embodiments, the predetermined period of time may be approximately 60 seconds.

In some alternate embodiments, after the fourth EAP message, both the supplicant 104 and the authenticator 102 may start a switchover timer that has a time-delay (e.g., on the order of ten seconds) that is larger than the maximum delay of both devices. During this time period, both supplicant 104 and the authenticator 102 may continue using the old key. After the time-delay of the switchover timer, both the supplicant 104 and the authenticator 102 may transmit using the new key and may continue to use both the old key and the new key for reception for at least a predetermined period of time.

Although wireless device 300 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), radio-frequency integrated circuits (RFICs) and combinations of various hardware and logic circuitry for performing at least the functions described herein. In some embodiments, the functional elements of wireless device 300 may refer to one or more processes operating on one or more processing elements.

In some embodiments, the wireless device 300 may be configured to receive orthogonal frequency division multiplexed (OFDM) communication signals over a multicarrier communication channel. The OFDM signals may comprise a plurality of orthogonal subcarriers. In some of these multicarrier embodiments, the wireless device 300 may be a wireless local area network (WLAN) communication station such as a wireless access point (AP), base station or a mobile station including a Wireless Fidelity (WiFi) device. In some embodiments, wireless device 300 may communicate wirelessly within the 2.4 GHz frequency band, the 5 GHz frequency band or the 60 GHz frequency band. In some broadband multicarrier embodiments, the wireless device 300 may be part of a broadband wireless access (BWA) network communication station, such as a Worldwide Interoperability for Microwave Access (WiMAX) communication station. In some other broadband multicarrier embodiments, the wireless device 300 may be a 3rd Generation Partnership Project (3GPP) Universal Terrestrial Radio Access Network (UTRAN) Long-Term-Evolution (LTE) communication station. In these broadband multicarrier embodiments, the wireless device 300 may be configured to communicate in accordance with an orthogonal frequency division multiple access (OFDMA) technique.

In some embodiments, the wireless device 300 may be configured to communicate in accordance with specific communication standards, such as the Institute of Electrical and Electronics Engineers (IEEE) standards, including IEEE 802.11-2007 and/or 802.11(n) standards and/or proposed specifications for WLANs, although the scope of the embodiments is not limited in this respect as the wireless device 300 may also be suitable to transmit and/or receive communications in accordance with other techniques and standards. In some embodiments, the wireless device 300 may be configured to communicate in accordance with the IEEE 802.16-2004, the IEEE 802.16(e) and/or IEEE 802.16(m) standards for wireless metropolitan area networks (WMANs), including variations and evolutions thereof, although the scope of the embodiments is not limited in this respect as the wireless device 300 may also be suitable to transmit and/or receive communications in accordance with other techniques and standards. In some embodiments, the wireless device 300 may be configured to communicate accordance with the Universal Terrestrial Radio Access Network (UTRAN) LTE communication standards. For more information with respect to the IEEE 802.11 and IEEE 802.16 standards, please refer to "IEEE Standards for Information Technology—Telecommunications and Information Exchange between Systems"— Local Area Networks—Specific Requirements—Part 11 "Wireless LAN Medium Access Control (MAC) and Physical Layer (PHY), ISO/IEC 8802-11: 1999", and Metropolitan Area Networks—Specific Requirements—Part 16: "Air Interface for Fixed Broadband Wireless Access Systems," May 2005 and related amendments/versions. For more information with respect to UTRAN LTE standards, see the 3rd Generation Partnership Project (3GPP) standards for UTRAN-LTE, release 8, March 2008, including variations and evolutions thereof.

In some other embodiments, the wireless device 300 may be configured to communicate signals that were transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, the wireless device 300 may be part of a portable wireless communication device, such as a personal digital assistant (PDA), a laptop or portable computer with wireless communication capability, a web tablet, a wireless telephone, a wireless headset, a pager, an instant messaging device, a digital camera, an access point, a television, a medical device (e.g., a heart rate monitor, a blood pressure monitor, etc.), or other device that may receive and/or transmit information wirelessly.

In some embodiments, the wireless device 300 may use two or more antennas 301 for communicating. The antennas 301 may comprise directional or omnidirectional antennas, including, for example, dipole antennas, monopole antennas, patch antennas, loop antennas, microstrip antennas or other types of antennas suitable for transmission of RF signals. In some embodiments, instead of two or more antennas 301, a single antenna with multiple apertures may be used. In these embodiments, each aperture may be considered a separate antenna. In some MIMO embodiments, antennas 301 may be effectively separated to take advantage of spatial diversity and the different channel characteristics that may result between the communication stations.

Figure 4:
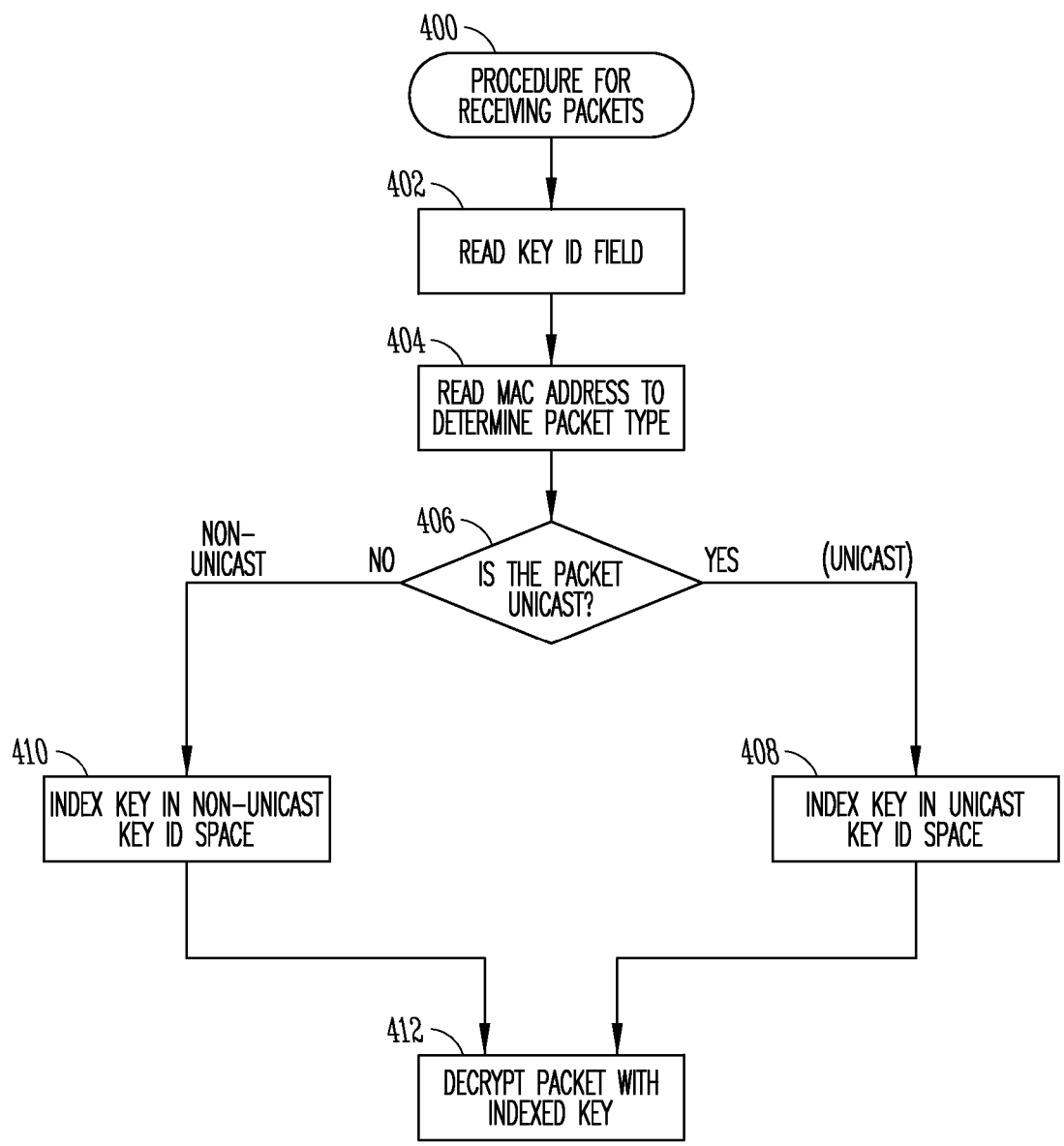
FIG. 4 is a flow-chart depicting a procedure for receiving packets during rekeying in accordance with some embodiments.

FIG. 4 is a procedure for receiving packets during rekeying in accordance with some embodiments. Procedure 400 may be performed by a wireless device, such as wireless device 300 (FIG. 3), during rekeying operations. In some embodiments, procedure 400 may be performed by a supplicant 104 (FIG. 1), for example, during a video-streaming session. In these embodiments, the supplicant 104 may receive unicast packets that comprise streamed video. The unicast packets may be encrypted with a first key. The supplicant 104 may receive a rekeying initiation message 201 (FIG. 2) to initiate rekeying operations and may install a second key for reception prior to transmission of a rekeying confirmation message 204 (FIG. 2) to the authenticator 102 (FIG. 1).

In some embodiments, in operation 402 the supplicant 104 may read a key ID field in a received unicast packet to determine whether to use the new key or the old key stored in the unicast key ID space for decrypting the received unicast packet. Alternatively, in operation 402 the supplicant 104 may read the new-key bit of the received unicast packet to determine whether to switch between either the new key or the old key stored in the unicast key ID space for decrypting the received unicast packet.

In some embodiments, in operation 404 the supplicant 104 may read the MAC address of the received packet to determine whether the received packet is either a unicast packet or a non-unicast packet. When the packet is a non-unicast packet, operation 410 may be performed. When the packet is a unicast packet, operation 408 may be performed.

In operation 408, the supplicant 104 may index the unicast key ID space based on the key ID field to identify one of the unicast keys. In operation 410, the supplicant 104 may index the non-unicast key ID space based on the key ID field to identify one of the non-unicast keys. In operation 412, the packet may be decrypted with the key determined in either operation 408 or 410.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A method performed by an authenticator for toggling between keys during an established secure communication session with a supplicant, the established secure communication session using a current pair-wise key for unicast communications, the method comprising:

installing a new pair-wise key for reception prior to receipt of a rekeying confirmation message;

continuing to use the current pair-wise key for transmission and delaying use of the new pair-wise key for transmission until after receipt of the rekeying confirmation message, wherein after installing the new pair-wise key for reception and prior to receipt of the rekeying confirmation message, the method further comprises:

receiving a unicast packet that includes a key ID field, the key ID field including a key ID portion and an Extended Key ID bit, the key ID portion identifying one of a plurality of keys, the Extended Key ID bit indicating whether to toggle between the current pair-wise key and the new pair-wise key;

reading the Extended Key ID bit in the key ID field of the received unicast packet to determine whether to decrypt the received unicast packet using the installed current pair-wise key or the installed new pair-wise key;

continuing to use the current pair-wise key for transmission;

the authenticator installing the new pair-wise key for use in decrypting received packets after receipt of a second message of the four-way handshake and prior to transmission of a third message of the four-way handshake; and the authenticator delaying use of the new pair-wise key for use in encrypting packets for transmission until after receipt of the fourth message and wherein the installing is performed by processing circuitry of the authenticator and the current and new pair-wise keys are stored in unicast key ID space of a memory; and further wherein the rekeying confirmation message is a fourth message of a four-way handshake for rekeying; and further wherein the supplicant is to install the new pair-wise key for reception prior to transmission of the rekeying confirmation message and is to delay using the new pair-wise key for transmission until after the transmission of the rekeying confirmation message; and further wherein the supplicant is to delay using the new pair-wise key for transmission until immediately after sending the rekeying confirmation message or a predetermined period of time after sending the rekeying confirmation message; and further wherein after installing the new pair-wise key for reception prior to receipt of the rekeying confirmation message, the method includes selecting either the new pair-wise key or the current pair-wise key for decrypting received unicast packets based on a key identifier carried in the received unicast packets; and further wherein the supplicant installs the new pair-wise key for use in decrypting received messages after receipt of the third message and prior to transmission of the fourth message, and wherein the supplicant delays installing the new pair-wise key for use in encrypting packets for transmission until either immediately after transmission of the fourth message or a predetermined period of time after transmission of the fourth message.

2. The method of claim 1 further comprising uninstalling the new pair-wise key if the four-way handshake fails to complete.

3. The method of claim 1 wherein the four-way handshake comprises exchanging Extensible Authentication Protocol over Local area network (EAPOL) Key frames in accordance with an IEEE 802.11 communication standard.

4. The method of claim 1 wherein the rekeying confirmation message is a fourth message of a four-way handshake for rekeying, and
wherein the authenticator comprises memory having unicast key ID space provided therein for two unicast keys for use in communicating unicast traffic, the two unicast keys comprising at least the current pair-wise key and the new pair-wise key.

5. The method of claim 4 further comprising alternating the use of two key identifiers between sequential four-way handshakes to prevent deletion of the current pair-wise key.

6. The method of claim 4 further comprising:
reading the key ID field in a received unicast packet;
identifying either the current pair-wise key or the new pair-wise key from the key ID field; and
using the identified key to decrypt the received unicast packet.

7. The method of claim 6 wherein the memory further includes non-unicast key ID space for one or more non-unicast keys, and
wherein the method further comprises:
determining whether a received packet is either a unicast packet or a non-unicast packet based on a media-access control address of the received packet;
indexing the unicast key ID space based on the key ID field to identify one of the unicast keys when the received packet is determined to be a unicast packet; and
indexing the non-unicast key ID space based on the key ID field to identify one of the non-unicast keys when the received packet is determined to be a non-unicast packet.

8. The method of claim 4 further comprising reading a new-key bit of a received unicast packet to determine whether to switch between keys for decrypting the received unicast packet, wherein the new-key bit is the Extended Key ID bit.

9. The method of claim 4 further comprising performing a four-way handshake to negotiate the new pair-wise key as part of a rekeying operation,
wherein the new pair-wise key is an asymmetric key generated by both the supplicant and the authenticator from information exchanged during the four-way handshake.

10. The method of claim 9 wherein the authenticator is an access point and the supplicant is a mobile station, and
wherein the access point and the mobile station communicate in accordance with an IEEE 802.11 communication standard.

11. A method performed by a supplicant for toggling between keys during an established secure communication session with an authenticator, the established secure communication session using a current pair-wise key for unicast communications, the method comprising:
installing a new pair-wise key for reception prior to transmission of a rekeying confirmation message to the authenticator;
continuing to use the current pair-wise key for transmission and delaying using the new pair-wise key for transmission until after the transmission of the rekeying confirmation message; and
supporting use of both the current pair-wise key for reception and the new pair-wise key for reception after the rekeying confirmation message,
wherein after installing the new pair-wise key for reception and prior to receipt of the rekeying confirmation message, the method further comprises using the current pair-wise key or the new pair-wise key based on a key ID field in a received unicast packet for reception while continuing to use the current pair-wise for transmission,
wherein the key ID field includes a key ID portion and an Extended Key ID bit, the key ID portion identifying one of a plurality of keys, the Extended Key ID bit indicating whether to toggle between presently installed keys,
wherein the installing is performed by processing circuitry of the supplicant and the current and new pair-wise keys are stored in unicast key ID space of a memory, and
wherein the method further includes reading the Extended Key ID bit in the key ID field of a received unicast packet to determine whether to toggle between the current pair-wise key and the new pair-wise key to decrypt the received unicast packet.

12. The method of claim 11 wherein the authenticator is to install the new pair-wise key for reception prior to receipt of the rekeying confirmation message, and is to delay use of the new pair-wise key for transmission until after receipt of the rekeying confirmation message, and
wherein both the supplicant and the authenticator continue to support use of the current pair-wise key for reception and the new pair-wise key for reception after the rekeying confirmation message.

13. The method of claim 12 wherein the supplicant continues to support the use of the current pair-wise key for reception and the new pair-wise key for reception until a predetermined period of time after transmission of the rekeying confirmation message, and
wherein the authenticator continues to support the use of the current pair-wise key for reception and the new pair-wise key for reception for a predetermined period of time after receipt of the rekeying confirmation message.

14. The method of claim 11 wherein the supplicant comprises memory having unicast key ID space provided therein for two unicast keys for use in communicating unicast traffic, the two unicast keys comprising at least the current pair-wise key and the new pair-wise key.

15. The method of claim 14 wherein the rekeying confirmation message is a fourth message of a four-way handshake for rekeying, and
wherein the method further comprises alternating use of two key identifiers between sequential four-way handshakes to prevent deletion of the current pair-wise key.

16. A wireless device comprising:
processing circuitry to perform rekeying operations during an established secure communication session which uses a current pair-wise key for unicast communications; and
memory having unicast key ID space to store at least two unicast keys for use in encrypting and decrypting packets comprising unicast traffic,
wherein when the wireless device operates as an authenticator, the processing circuitry is to install a new pair-wise key for reception prior to receipt of a rekeying confirmation message, continue to use the current pair-wise key for transmission, and delay use of the new pair-wise key for transmission until after receipt of the rekeying confirmation message,
wherein when the wireless device operates as an authenticator, the authenticator continues to support the use of the current pair-wise key for reception and the new pair-wise key for reception for a predetermined period of time after receipt of the rekeying confirmation message,
wherein after installing the new pair-wise key for reception and prior to receipt of the rekeying confirmation message, the processing circuitry is configured to use the current pair-wise key or the new pair-wise key based on a key ID field in a received unicast packet for reception while continuing to use the current pair-wise key for transmission, wherein the key ID field includes a key ID portion and an Extended Key ID bit, the key ID portion identifying one of a plurality of keys, the Extended Key ID bit indicating whether to toggle between presently installed keys, and wherein the processing circuitry is configured to read the Extended Key ID bit in the key ID field of the received unicast packet to determine whether to toggle between the current pair-wise key and the new pair-wise key to decrypt the received unicast packet.

17. The wireless device of claim 16 wherein when the wireless device operates as a supplicant, the processing circuitry is to install the new pair-wise key for reception prior to transmission of the rekeying confirmation message and is to delay use of the new pair-wise key for transmission until after the transmission of the rekeying confirmation message, and wherein when the wireless device operates as a supplicant, the supplicant continues to support the use of the current pair-wise key for reception and the new pair-wise key for reception until a predetermined period of time after transmission of the rekeying confirmation message.

18. The wireless device of claim 17 wherein the rekeying confirmation message is a fourth message of a four-way handshake for rekeying, and wherein the four-way handshake comprises exchanging Extensible Authentication Protocol over Local area network (EAPOL) Key frames in accordance with an IEEE 802.11 communication standard.

19. The wireless device of claim 17 wherein the rekeying confirmation message is a fourth message of a four-way handshake for rekeying, and wherein the authenticator alternates use of two key identifiers between sequential four-way handshakes to prevent deletion of the current pair-wise key.

20. A method of rekeying performed by a supplicant during a secure video-streaming session that uses a first pair-wise key for unicast communications, the method comprising:

receiving unicast packets that comprise streamed video, the unicast packets being encrypted with the first pair-wise key;

receiving a rekeying initiation message to initiate rekeying operations;

installing a second pair-wise key for reception prior to transmission of a rekeying confirmation message to an authenticator;

continuing to use the first pair-wise key for transmission and delaying use of the second pair-wise key for transmission until after receipt of a rekeying confirmation message;

reading an Extended Key ID bit in a key ID field of received unicast packets to determine whether to toggle between the first and second pair-wise keys to decrypt each received unicast packet, the key ID field including a key ID portion and the Extended Key ID bit, the key ID portion identifying one of a plurality of keys, the Extended Key ID bit indicating whether to toggle between presently installed keys; and supporting reception of the unicast packets with both the first key and the second key until a predetermined period of time after transmission of the rekeying confirmation message, wherein the installing is performed by processing circuitry of the supplicant and the current and new pair-wise keys are stored in unicast key ID space of a memory.

21. The method of claim 20 further comprising delaying installation of the second key for transmission until immediately after transmission of the rekeying confirmation message.

22. The method of claim 20 further comprising uninstalling the first key for use in receiving after the predetermined period of time after transmission of the rekeying confirmation message.

23. The method of claim 22 wherein the rekeying confirmation message is a fourth message of a four-way handshake for rekeying.

24. The method of claim 22 wherein the method further comprises alternating use of two key identifiers between sequential handshakes to prevent deletion of the first key.

* * * * *

UNITED STATES PATENT AND TRADEMARK OFFICE
CERTIFICATE OF CORRECTION

PATENT NO.         : 8,630,416 B2  
APPLICATION NO.    : 12/643009  
DATED              : January 14, 2014  
INVENTOR(S)        : Qi et al.

Page 1 of 1

It is certified that error appears in the above-identified patent and that said Letters Patent is hereby corrected as shown below:

On the Title Page, Item (56)

On page 2, in column 1, under "Other Publications", line 5, delete ""international" and insert --"International--, therefor On page 2, in column 2, under "Other Publications", line 18, delete "IIEEE" and insert --IEEE--, therefor On page 2, in column 2, under "Other Publications", line 19, delete "802.11i-2004," and insert --802.11-2004,--, therefor On page 2, in column 2, under "Other Publications", line 21, delete "mailed" and insert --filed--, therefor In the Claims In column 10, line 31, in Claim 1, delete "message" and insert --message,--, therefor Signed and Sealed this  
Eighteenth Day of November, 2014

Michelle K. Lee  
*Deputy Director of the United States Patent and Trademark Office*